(12) United States Patent
Shima

(10) Patent No.: US 6,867,874 B1
(45) Date of Patent: Mar. 15, 2005

(54) DIRECT SERVER-ACCESSING PRINTER AND CONTROL METHOD THEREOF

(75) Inventor: Toshihiro Shima, Nagano (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 09/442,152

(22) Filed: Nov. 16, 1999

(30) Foreign Application Priority Data

Nov. 27, 1998 (JP) .......................................... 10-336670

(51) Int. Cl.[7] .............................................. G06F 15/00
(52) U.S. Cl. .................... 358/1.15; 358/442; 358/468; 379/100.01
(58) Field of Search ................................ 358/1.1, 1.12, 358/1.13, 1.15, 1.16, 1.17, 400, 403, 434, 442, 468, 402, 426.02, 426.04, 404; 379/100.01

(56) References Cited

U.S. PATENT DOCUMENTS

| | | | | |
|---|---|---|---|---|
| 5,907,598 A | * | 5/1999 | Mandalia et al. ...... | 379/100.01 |
| 6,009,153 A | * | 12/1999 | Houghton et al. ...... | 379/102.02 |
| 6,011,905 A | * | 1/2000 | Huttenlocher et al. ...... | 395/102 |
| 6,222,634 B1 | * | 4/2001 | Dubbels et al. ............ | 358/1.15 |
| 6,240,445 B1 | * | 5/2001 | Kumar et al. ............... | 709/206 |
| 6,338,096 B1 | * | 1/2002 | Ukelson ..................... | 709/319 |
| 6,628,413 B1 | * | 9/2003 | Lee ........................... | 358/1.15 |

* cited by examiner

*Primary Examiner*—Mark Wallerson
(74) *Attorney, Agent, or Firm*—Osha & May L.L.P.

(57) ABSTRACT

The present invention is a printer capable of directly accessing a server on a network. This printer makes a first request for obtaining a resource, determines the structure of the resource based on the first response to the first request, sets pages to be printed based on the structure of the determined resource, makes a second request for obtaining the structural data within the set pages to be printed, generates print data based on the second response to the second request, and prints the resource based on the generated print data. Thereby, the time required for obtaining a resource from a server and printing such resource is shortened, and the network resources may be used efficiently.

9 Claims, 12 Drawing Sheets

| Data Format | Sub Format | Printable Data | Option |
|---|---|---|---|
| Text | Plain | ○ | × |
| ⋮ | ⋮ | ⋮ | ⋮ |
| Application | Octet-Steram | × | × |
| Image | GIF | ○ | ○ |
|  | JPEG | ○ | × |
|  | PNG | ○ | ○ |
| Audio | Basic | × | × |
| Video | MPEG | ○ | ○ |
| ⋮ | ⋮ | ⋮ | ⋮ |

| Option | Condition |
|---|---|
| Motion-Image Data | Transfer Request of Specific Frame |
| ⋮ | ⋮ |

| CACHE DATA | CACHE PRESERVATION TERM |
|---|---|
| DOWNLOAD FONT | 10 DAYS |
| TEXT DATA | 1 DAYS |
| MAGE DATA OF SMALL SIZE | 1 DAYS |
| IMAGE DATA OF LARGE SIZE | 10 DAYS |
| ⋮ | ⋮ |

DIRECT SERVER-ACCESSING PRINTER AND CONTROL METHOD THEREOF

BACKGROUND OF THE INVENTION

1. Field of the Invention

The present invention relates to printer technology for directly accessing a resource existing on a network such as the Internet, and downloading and printing such resource.

2. Description of the Related Art

A network-compatible printer connected to a network such as a LAN (Local Area Network) and shared by a plurality of computers has been conventionally known. This type of printer passively receives a print request sent from the computer via the network and prints in accordance therewith.

Meanwhile, in recent years, the WWW (World Wide Web) is rapidly becoming popular on the Internet. In this WWW, the browser on the client computer obtains a resource (information resource, such as a Web page) by accessing a Web server in accordance with a URI (Uniform Resource Identifier). Upon the browser obtaining this resource, if a resource previously obtained from the same URI is cached on a hard disk or the like, the browser uses such cached resource without accessing the Web server. The browser presents this obtained resource on a screen, or stores it on a hard disk or the like. The browser converts this obtained resource into a print request when necessary, and sends this request to the printer.

As mentioned above, a typical conventional printer would print upon passively receiving a print request sent from a computer, and could not obtain the resource by actively accessing the server.

Thus, when a user is to print a resource on the WWW, the user must foremost turn on the computer and activate the browser, access the Web server by operating this browser and then, after obtaining the desired resource, send a print request to the printer.

Incidentally, although a printer has sufficient memory for generating print data, it cannot obtain all the resources when trying to directly obtain such resources from the Web server due to the limitation in the capacity of this memory. Therefore, even when attempting to obtain all the resources, an error may occur prior to printing if the memory is not able to read all such resources. Moreover, this led to wasteful communication resources.

SUMMARY OF THE INVENTION

An object of the present invention is to shorten the time required for obtaining a resource from a server and printing such resource, as well as to efficiently use the network resources.

Particularly, the object of the present invention is to provide a printer capable of directly obtaining a resource from a server and printing such resource, without having to go through a computer.

Another object of the present invention is to provide a printer capable of obtaining only necessary data and printing such data upon a printer directly obtaining a resource from a server and printing such resource.

In order to achieve the aforementioned objects, the present invention is specified as follows.

The present invention is a printer characterized in that it makes a first request for obtaining a resource (document), determines the structure (page layout) of the resource based on the first response to the first request, sets pages to be printed (range of obtained data) based on the structure of the determined resource, makes a second request for obtaining the structural data within the set pages to be printed, generates print data based on the second response to the second request, and prints the resource based on the generated print data.

Here, the second request may be made in accordance with the data format of the structural data. Upon judging whether the data format of the structural data is printable, the second request may also be made to the structural data judged as being printable data. Upon judging whether the data format of the structural data is moving picture data, and if judged as being moving picture data, the second request may also be made to a specified frame data within the structural data.

With respect to structural data included in the pages not set as pages to be printed, it is desirable that no request is made for obtaining such data. Thereby, it is possible to avoid resources not required for printing from continuing to consume the internal memory of the printer at such time, and the printer may be structured with a small memory.

The present invention can also be effected as a program for making a printer realize prescribed functions or as a recording medium having such program recorded thereon. A recording medium includes, for example, hard disk (HD), DVD-ROM, DVD-RAM, flexible disk (FD), CD-ROM, and memories such as RAM and ROM. The printer mentioned above comprises a central processing unit such as a CPU or MPU, and includes a control device which performs prescribed processing steps by the CPU interpreting the program.

DESCRIPTION OF THE PREFERRED EMBODIMENTS

Embodiments of the present invention are now explained with reference to the relevant drawings.

[First Embodiment]

Figure 1:
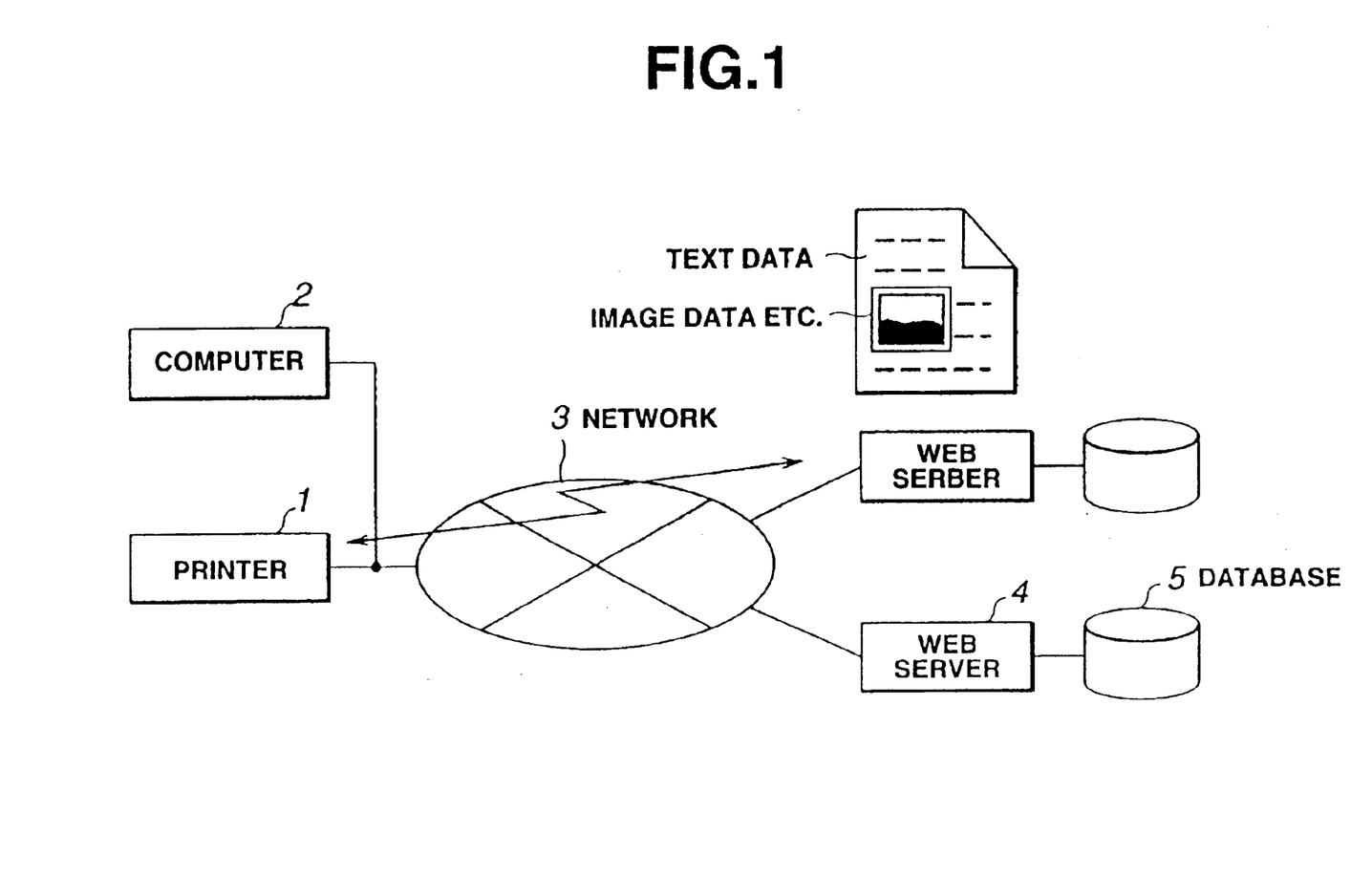
FIG. 1 is a structural diagram showing the outline of the printing system using the printer according to the present invention.

FIG. 1 is a structural diagram showing the outline of the printing system using the printer according to the present invention. The present embodiment is explained taking the WWW as an example.

As shown in FIG. 1, a printer 1 forms an Intranet by being connected to a computer 2 by a LAN etc. The printer 1 is connected to a network 3 such as the Internet via a router not shown, and is capable of accessing a Web server 4. By designating the URL, the printer 1 makes a transfer request of a resource (document) to the Web server 4, and this Web server 4 searches the corresponding document from a database 5 in accordance with this transfer request, and transfers this document to the printer 1.

For example, when provided a URL, the printer 1 sends a connection request to the Web server 4 on the network 3 in accordance with such URL, and receives a connection completion response from the Web server 4. The printer 1 sends a transfer request of a resource to the Web server 4. Upon receiving this transfer request, the Web server 4 searches the resource from the database 5 and sends the searched resource text to the printer 1. The printer 1 then analyzes the text of the sent resource, extracts the URL of the structural data (inline data) of image data etc. structuring the resource, and sends a transfer request of the structural data in accordance with this URL. When receiving a transfer request of the structural data, the Web server 4 similarly searches the structural data from the database 5, and sends the structural data to the printer 1. The printer 1 structures the resource based on the structural data, further generates a print image, and prints this to a print recording medium such as paper. Accordingly, the printer 1 according to the present embodiment is capable of directing obtaining a resource from the Web server 4 on the network and printing such resource.

Figure 2:
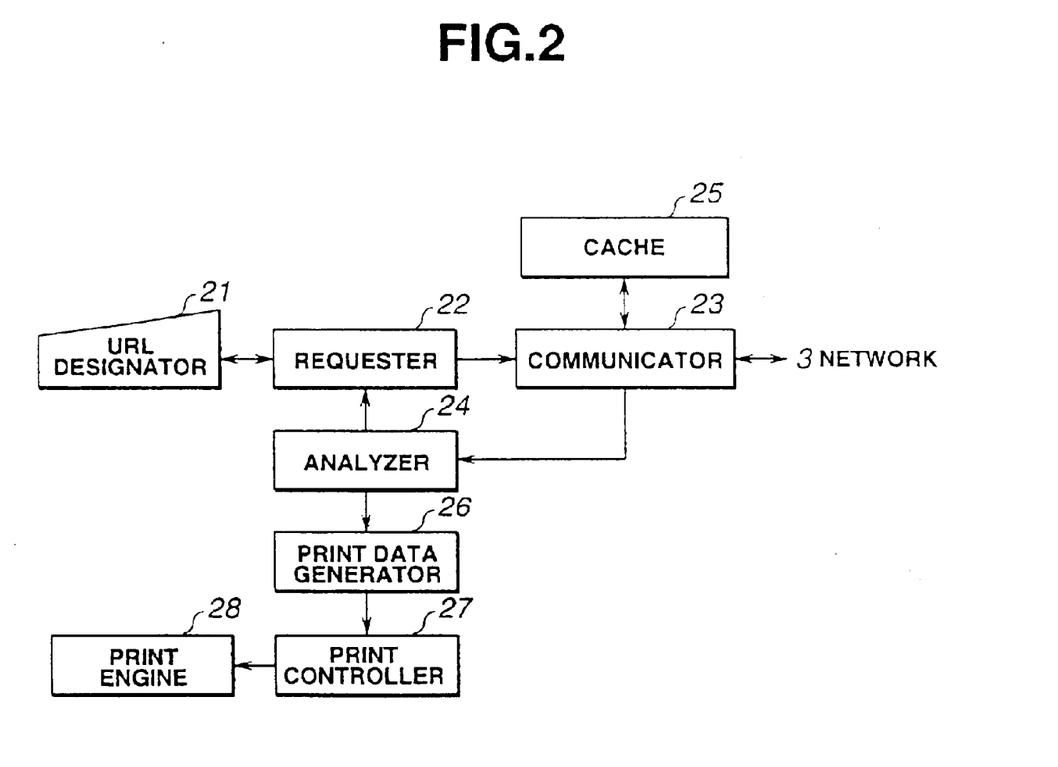
FIG. 2 is a block diagram showing the structure of the printer according to the first embodiment.

FIG. 2 is a functional block diagram showing the structure of the printer according to the present embodiment. As shown in FIG. 2, upon obtaining a resource from the Web server 4 and printing the same, the URL designator 21 inputs information (URL for example) for designating such resource. The URL designator 21 may be structured such that the user can directly input the URL, or be structured such that a desired URL can be input upon selecting one from a previously registered URL list. The URL designator 21 may also be structured such that the URL is input from a computer 2. The URL designator 21 sends the input URL to the requester 22.

The requester 22 generates a request message (transfer request message) for requesting a transfer (transmission) of data (resource and the structural data thereof) to a Web server 4 shown on the URL designated by the URL designator 21, and sends this to a communicator 23. During the process of receiving the resource, the requester 22 generates a request message for requesting the transfer of the structural data in order to obtain the structural data included in the pages to be printed set by an analyzer 24 explained later.

The communicator 23 physically and/or logically converts the request message sent from the requester 22 and sends this to the network 3. The communicator 23 receives data (including a response message to the request message) sent via the network 3 from the Web server 4, physically and/or logically converts and sends this data to the analyzer 24, and also sends this data to a cache 25 comprising a cache mechanism. Upon sending a request message, the communicator 23 refers to the cache 25 regarding whether the cache 25 is storing (caching) data for requesting the transfer to the Web server 4. When the cache 25 misses a cache, the communicator 23 sends a request message to the network 3 and receives the response message thereof. Contrarily, when the cache 25 hits a cache, the communicator 23 does not send a request message and sends the data sent from the cache 25 to the analyzer 24 as the response message.

The analyzer 24 analyzes the response message sent via the communicator 23, determines the structure of the resource, and sets the pages to be printed based on the structure of this resource. That is, the analyzer 24 determines the page layout of the resource based on information relating to the size of data and information relating to the position of data included in the response message, and sets the pages of the resource to be printed in accordance with this page layout.

The print data generator 26 generates print data of the pages to be printed based on the structure of the resource analyzed by the analyzer and data sent from the Web server 4 pursuant to the transfer request made by the requester 22.

The print controller 27 sends the generated print data while monitoring the processing state of the print engine 28. In other words, the print engine 28 includes, for example, a paper feeding mechanism and print head etc. and is used for printing on a print recording medium such as paper. The print engine 28 may be structured of various engines used in, for example, a page printer such as a laser printer which prints in page units, serial printer such as an inkjet printer and thermal transfer printer which prints in one character units, and line printer which prints in one line units. The print controller 27 realizes printing by controlling the paper feeding mechanism and print head of the print engine 28 while sending print data.

Figure 3:
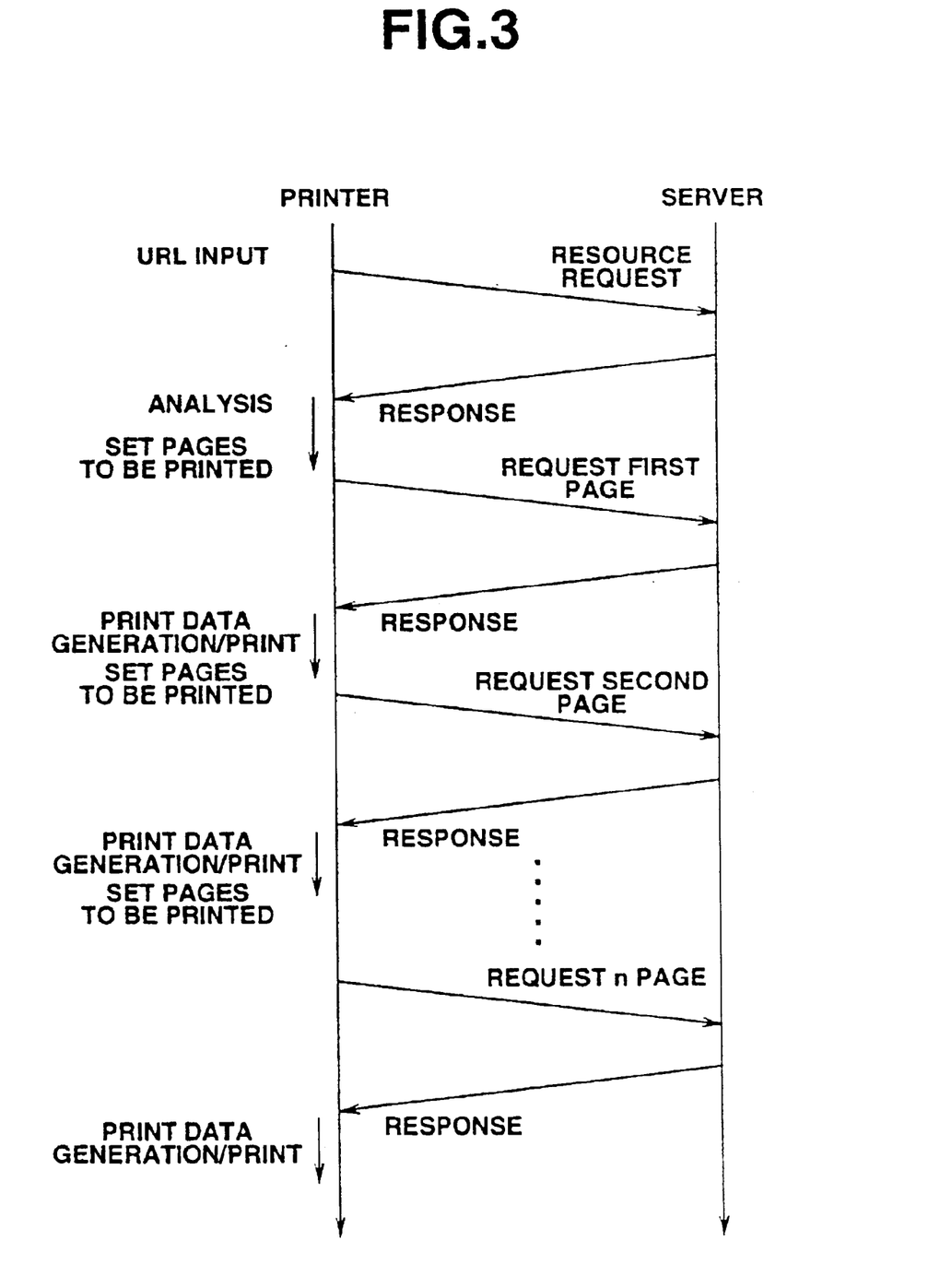
FIG. 3 is a diagram for explaining, conceptually, the operation of the printer according to the first embodiment.

FIG. 3 is a diagram for explaining, conceptually, the operation of the printer according to the present embodiment. The printer of the this embodiment is characterized in that it foremost determines the structure of the resource to be printed based on the response to the transmission request of the resource to the server, successively sets pages to be printed in accordance with the structure of this resource, and prints upon making a transmission request and responding thereto of necessary data for printing the set pages to be printed.

When a URL is input to the printer 1, the printer 1 generates a request message in accordance with this URL and requests to the Web server 4 the transmission of the resource. The Web server 4 prepares a response message including information relating to the structure of the resource based on the request message to be transmitted, and transmits this to the printer 1, which is the requester.

Figure 4:
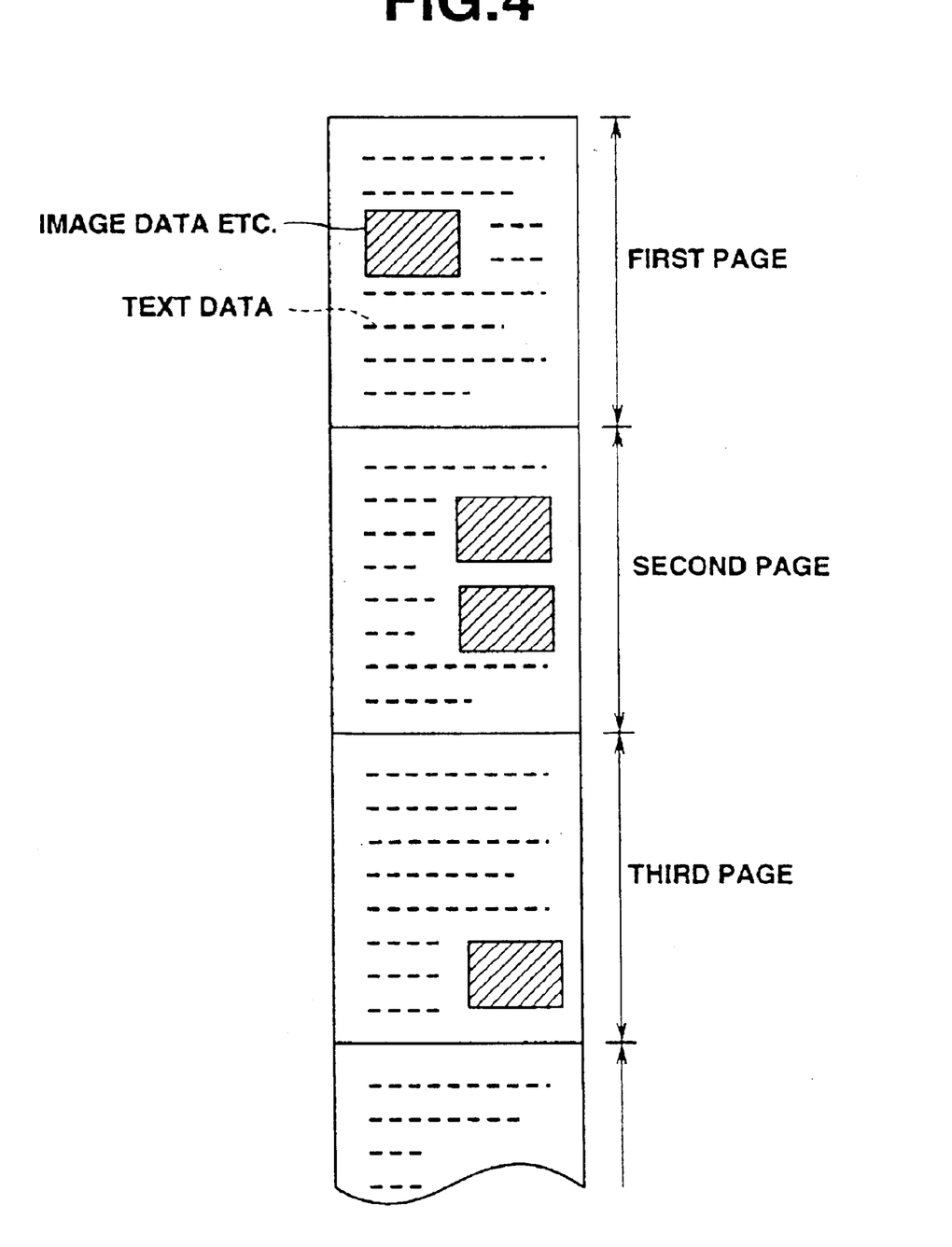
FIG. 4 is a diagram for explaining the pages to be printed.
Figure 5:
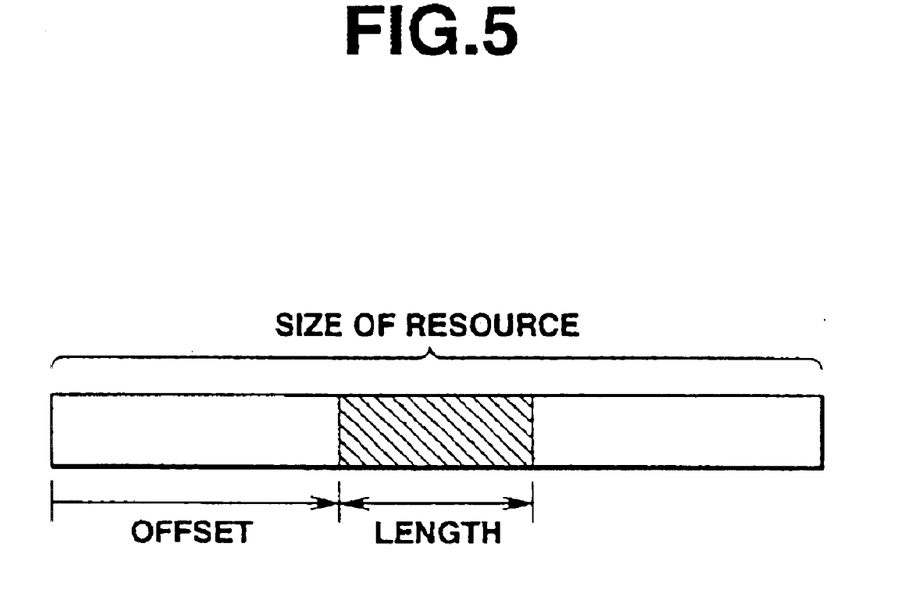
FIG. 5 is a diagram showing one example of the method of designating the data to be obtained.

Upon receiving a response message, the printer 1 analyzes this and determines the structure of the resource, and sets the pages to be printed based on the structure of this resource. Pages to be printed, for example, as shown in FIG. 4, are set pursuant to the layout of the text data and image data in conformity with the paper size. In order to obtain data of the desired pages to be printed, in this embodiment, the offset value from the top data of the resource and the data length are represented during the data transfer request as shown in FIG. 5. The printer 1 generates a request message for requesting the transmission of partial data of the resource designated by this offset value and data length, and sends this to the Web server 4. The Web server 4 prepares a response message including data, to which a transmission request was made, based on the request message to be transmitted and transmits this to the printer 1, which is the requester.

The printer 1 generates print data of pages to be printed based on the response message, and prints such data. The printer 1 successively sets pages to be printed in accordance with the progress of printing, requests the transmission of data of the set pages to be printed, and receives and prints such data.

Although FIG. 5 is explained sequentially in order to describe, conceptually, the operation of the printer according to the present embodiment, a separate request and response, for example, may be made independently even during printing.

Figure 6:
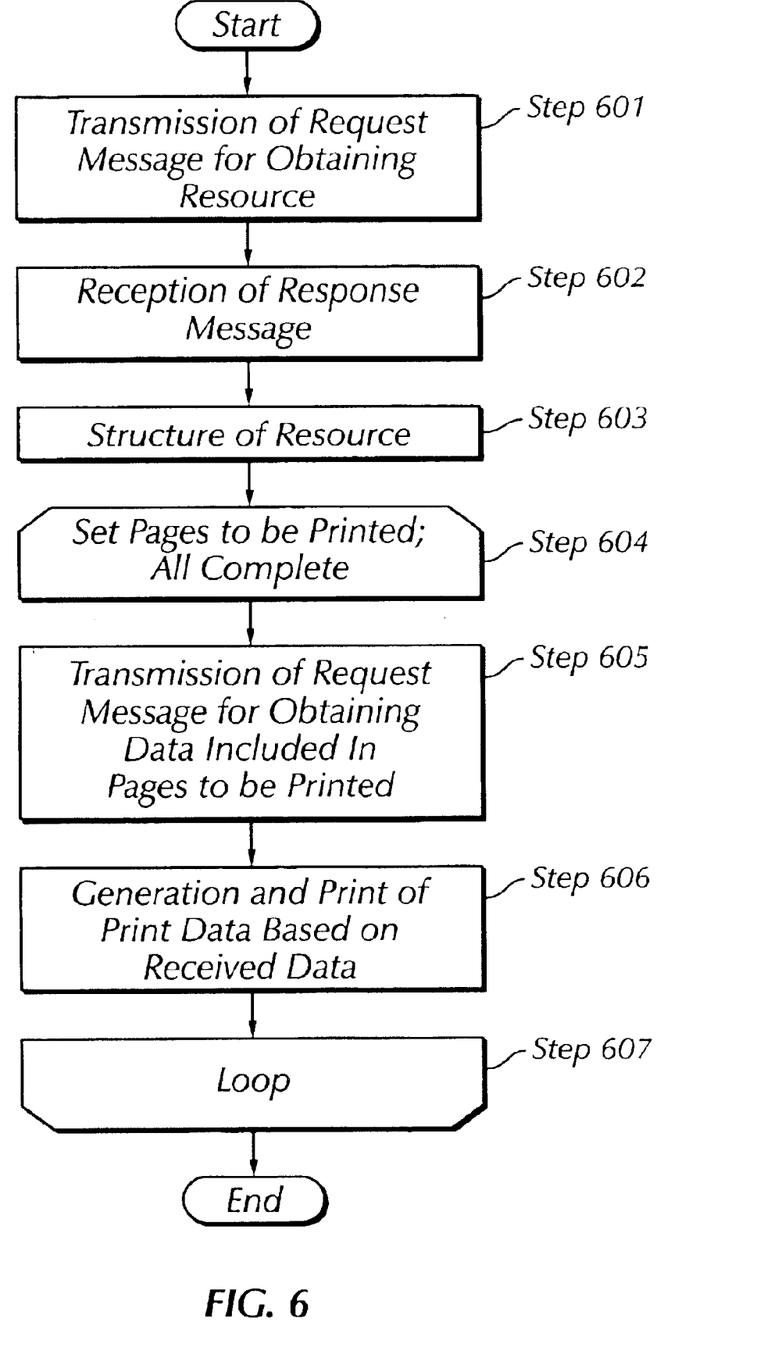
FIG. 6 is a flowchart showing the processing of the printer according to the first embodiment.

FIG. 6 is a flowchart showing the processing of the printer according to the present embodiment. As shown in FIG. 6, upon receiving a URL from the URL designator 21, the requester 22 generates a request message in order to obtain the resource shown by the URL and sends this to the communicator 23. The communicator 23 sends this request message to the network 3 (STEP 601) and receives a response message to the request message from the Web server 4 (STEP 602). The analyzer 24 determines the structure of the resource based on the response message transmitted from the Web server 4 (STEP 603). That is, the analyzer 24 determines the page layout of the resource based on the response message. The requester 22 sets the pages to be printed and repeats the processing steps until the setting of all pages to be printed is complete (STEP 604–607). In other words, the requester 22 generates and sends the request message for requesting the transmission of data (structural data) included in the set pages to be printed (STEP 605). The print data generator 26 generates print data upon obtaining the structural data from the Web server 4 and the print controller 27 controls the print engine 28 and prints such data (STEP 606). The requester 22 returns to STEP 604 in the event the obtainment and print of all pages to be printed are incomplete (STEP 607).

Although each processing is explained by being sequentially structured in the present embodiment, the order of the processing steps may be exchanged or each of the processing steps may be performed in parallel, so as long as no contradiction arises in the result thereof.

Further, although the requester 22 was made to successively set the pages to be printed from the first page, it is not especially necessary to be particular thereto. For example, it is possible to make only the page designated by the user the page to be printed.

According to the present embodiment as mentioned above, upon obtaining a resource from a server on a network and printing the same, the user is able to directly obtain and print such resource with a printer. Thus, the user is not required to perform troublesome operations such as the activation of the computer or browser.

Moreover, according to this embodiment, as printing is performed upon setting pages to be printed based on the structure of the resource and obtaining data of such portion, it is not necessary for the printer to obtain the entire resource at once in order to perform print processing. Therefore, it is not required to increase the memory more than necessary even upon directly obtaining the resource from the server without going through the computer.

[Second Embodiment]

Upon obtaining a resource from a Web server and printing the same, the printer according to the present embodiment determines whether such resource can be obtained in one-lump and, when not possible, successively sets pages to be printed, and obtains and prints such pages as with the previous embodiment.

Figure 7:
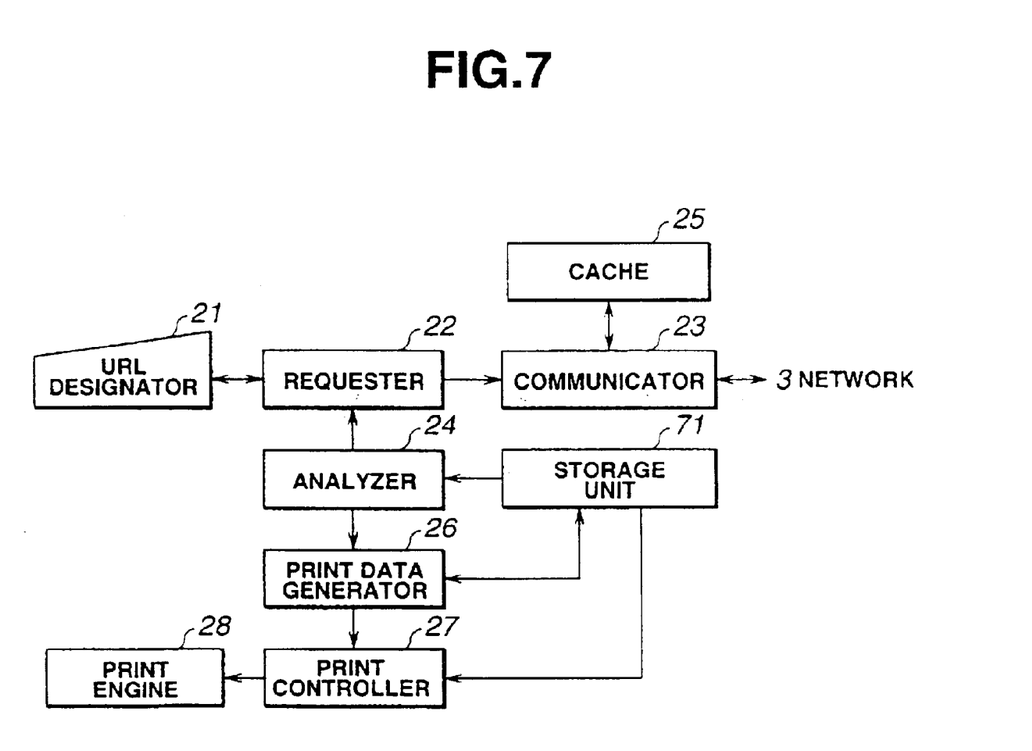
FIG. 7 is a block diagram showing the structure of the printer according to the first embodiment.

FIG. 7 is a functional block diagram showing the structure of the printer of this embodiment. Referring to FIG. 7, the same reference numerals are given to the function realizing means which are the same as the first embodiment, and the explanation thereof is omitted.

The storage unit 71 temporarily stores data sent from the communicator 23 and retains the print data generated by the print data generator 26.

The analyzer 72 analyzes the response message sent via the communicator 23, determines the structure of the resource, and sets the pages to be printed based on the structure of such resource. The analyzer 72 further compares the size of the resource to be obtained with the capacity of the storage unit 71 necessary for receiving and printing such resource, and determines whether a one-lump obtainment is possible.

Figure 8:
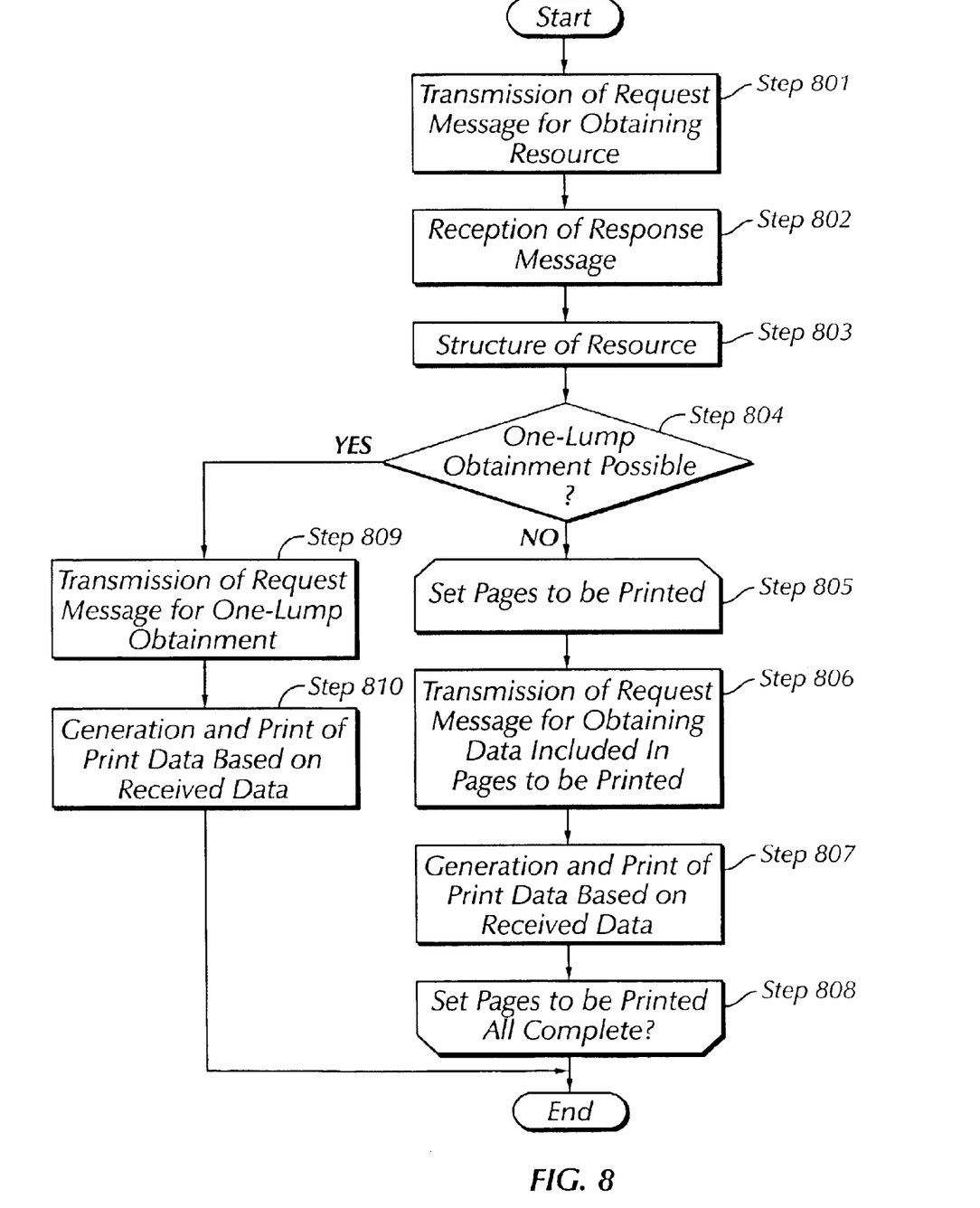
FIG. 8 is a flowchart showing the processing of the printer according to the second embodiment.

FIG. 8 is a flowchart showing the processing of the printer of this embodiment. The flowchart shown in FIG. 8 differs from the flowchart in FIG. 6 in that the processing in STEP 804 is performed for determining whether a one-lump obtainment is possible. That is, as shown in FIG. 6, when provided with a URL from the URL designator 21, the requester 22 generates a request message in order to obtain the resource shown by the URL and sends this to the communicator 23. The communicator 23 sends this request message to the network 3 (STEP 801) and receives a response message to such request message from the Web server 4 (STEP 802). The analyzer 72 compares the size of the resource to be obtained with the capacity of the storage unit 71 necessary for receiving and printing such resource (STEP 804). When the analyzer 72 determines that a one-lump obtainment is not possible, the requester 22 sets the pages to be printed (STEP 805), and generates and sends a request message for requesting the transmission of data (structural data) included in such pages to be printed (STEP 806). Upon obtaining the structural data from the Web server 4, the print data generator 26 generates print data pursuant thereto, and prints this under the control of the print controller 27 (STEP 807). Then, the requester 22 determines whether the obtainment and printing of all pages to be printed are complete based on the structure of the resource (STEP 808) and, when there are pages still to be printed, returns to STEP 805.

Meanwhile, in STEP 804, when the analyzer 72 determines that a one-lump obtainment is possible, the requester 22 generates a request message for a one-lump obtainment and the communicator 23 sends this message (STEP 809). Upon obtaining the data transmitted from the Web server 4, the print data generator 26 generates print data pursuant thereto and prints this under the control of the print controller 27 (STEP 810).

According to the present embodiment as mentioned above, as well as being able to achieve the same advantages as the first embodiment, the following advantages may also be achieved.

In other words, according to the present embodiment, as the memory of the printer and the data size of the resource are compared in order to determine whether a one-lump obtainment of such resource is possible, the resource may be suitably obtained and printed in accordance with the remaining capacity etc. of the printer's internal memory.

[Third Embodiment]

Upon obtaining data included in the pages to be printed, the printer according to the present embodiment requests a transfer only for printable data, and obtains and prints this data. That is, although a resource is generally structured of text data and image data, a certain resource may be structured by having audio data included therein. As the printer cannot print audio data, obtaining this will cause wasteful communication. Thus, only printable data is obtained in order to seek efficiency of the processing.

Figure 9:
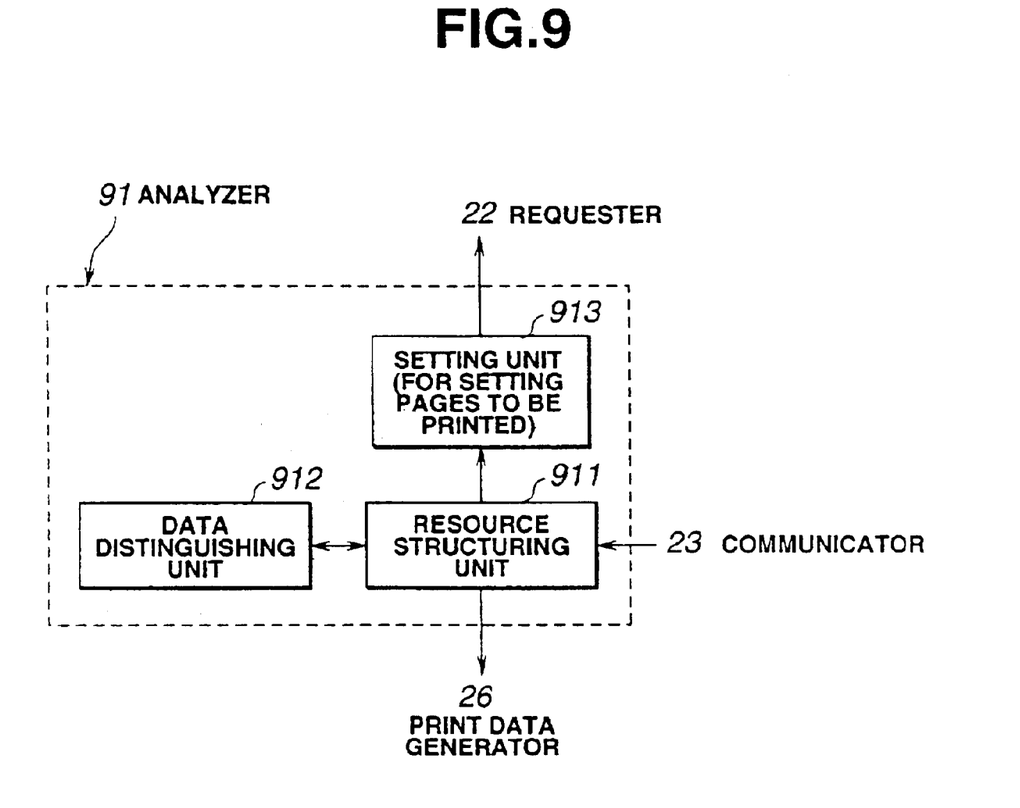
FIG. 9 is a block diagram showing the details of the analyzer of the printer according to the third embodiment.

FIG. 9 is a functional block diagram showing the details of the analyzer of the printer of this embodiment. As shown in FIG. 9, the analyzer 91 is comprised of a resource structuring unit 911 for determining the resource structure, a setting unit 913 for setting the pages to be printed based on the resource structure, and a data distinguishing unit 912 for distinguishing the data format included in the pages to be printed.

The resource structuring unit 911 determines the structure (page layout) of the resource based on the response message transmitted from the Web server 4, and sends this to the setting unit 913. In this case, the resource structuring unit 911 refers to the data distinguishing unit 912 regarding the data format of the structural data structuring the resource, and performs the layout in accordance with the result thereof.

Figure 10:
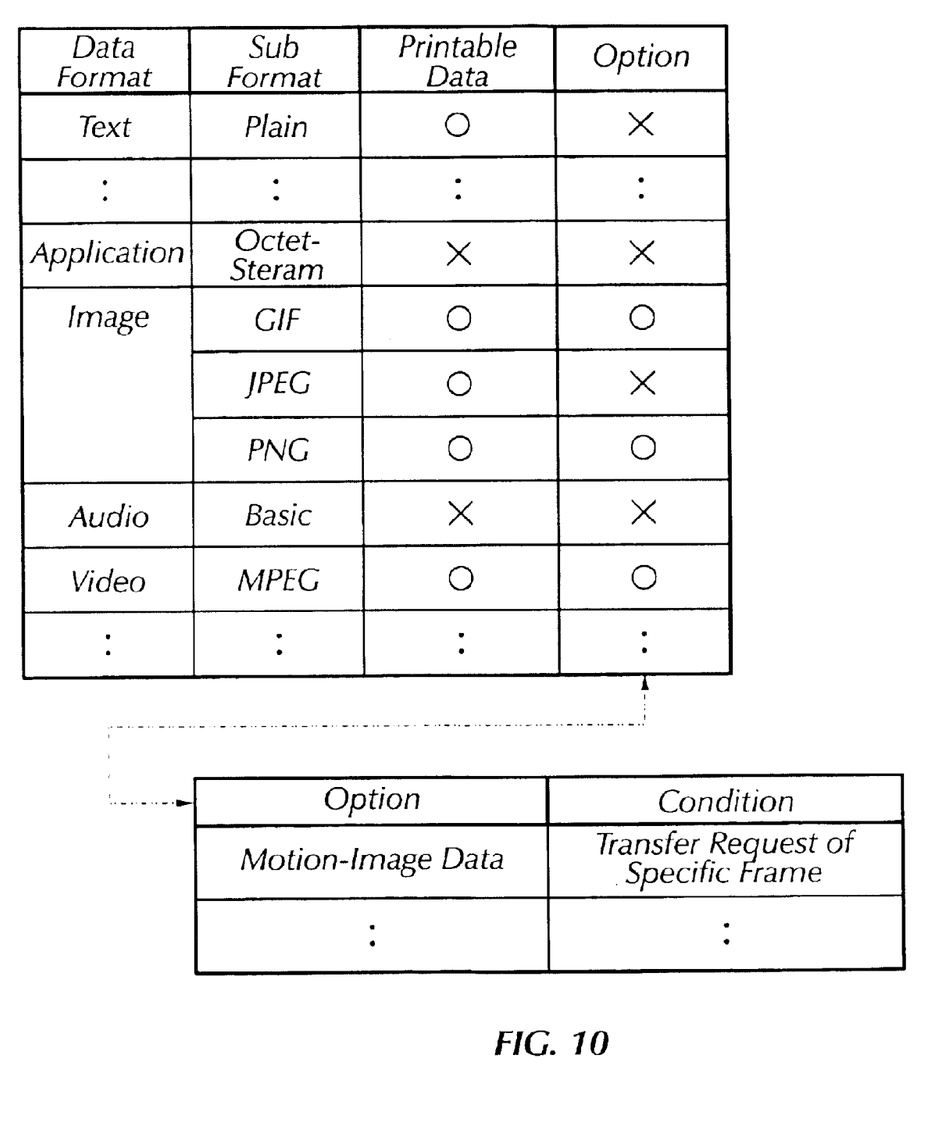
FIG. 10 is a diagram showing one example of a data format.

The data distinguishing unit 912, as shown in FIG. 10, stores information in correspondence with each data format regarding whether or not it is printable data. In response to the reference made by the resource structuring unit 911 regarding the data format, the data distinguishing unit 912 replies as to whether it is printable data and, when it is in a moving picture data format, provides conditions upon making the transfer request. For example, as shown in FIG. 10, an option is provided to a gif format or a png format, and it is further judged whether such data is moving picture data. When it is moving picture data, provided is a condition such as transferring a specific frame (top frame for example) among the plurality of frames structuring the moving picture data.

The setting unit 913 sets the pages to be printed in accordance with the resource structure and notifies this as well as the distinction result of the data distinguishing unit 912 to the requester 22.

Figure 11:
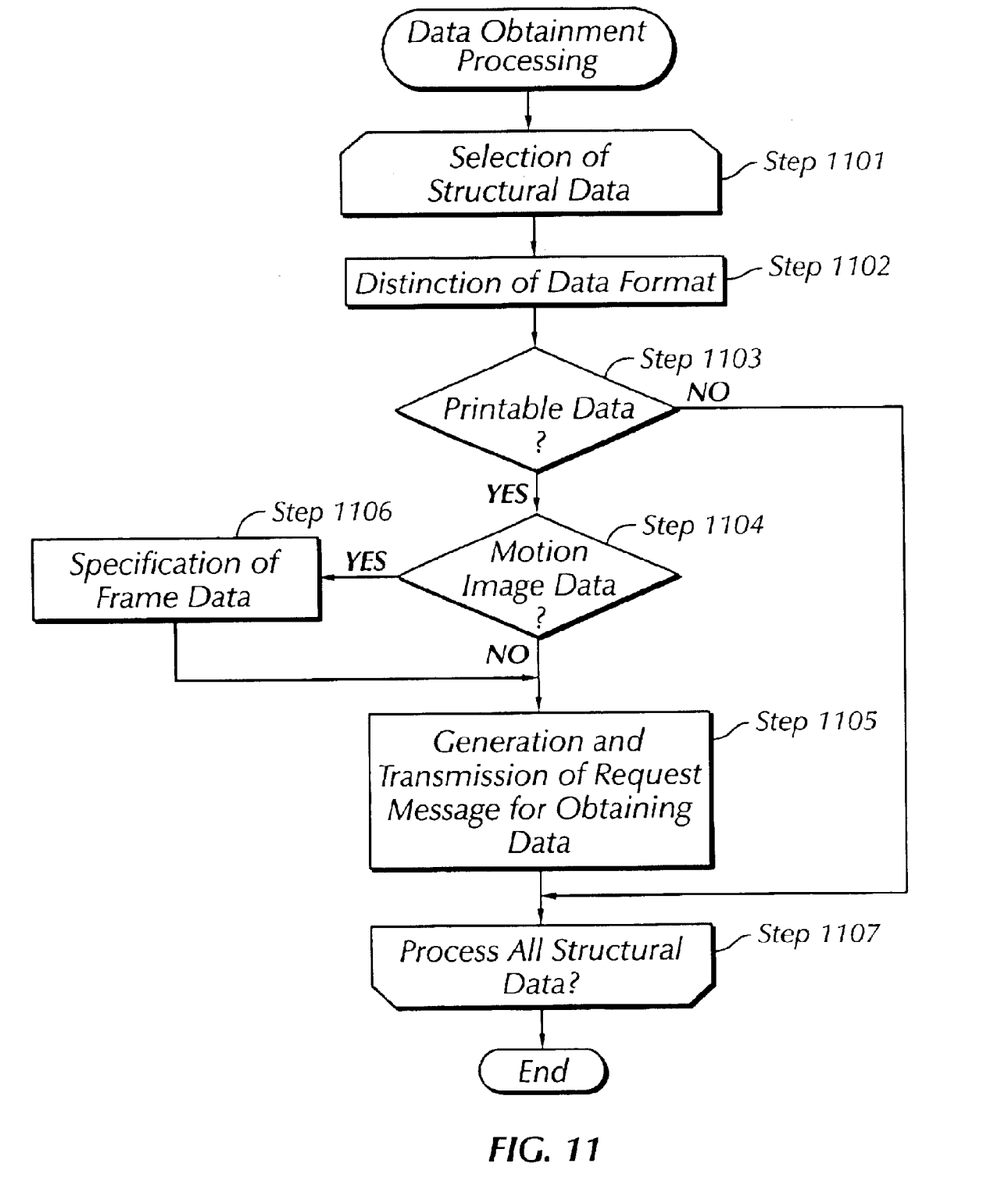
FIG. 11 is a flowchart showing the processing of the printer according to the third embodiment.

Next, reference is made to FIG. 11 for the explanation of the processing of the printer of this embodiment. FIG. 11 is a flowchart in which STEP 605 shown in FIG. 6 has been improved.

Referring to FIG. 11, the analyzer 91 selects structural data among the structural data group structuring the resource (STEP 1101). The analyzer 91 refers to the data format of such selected structural data (STEP 1102), and judges whether this is printable data (STEP 1103). When the analyzer 91 judges that it is printable data, it further judges whether this structural data is moving picture data (STEP 1104). When the analyzer 91 judges that it is not moving picture data, the requester 22 generates a request message for obtaining such structural data, and the communicator 23 transmits this to the Web server 4 (STEP 1105).

Contrarily, when the analyzer 91 judges that it is moving picture data, it specifies the data structuring the moving picture data (1 frame worth of data for example) by the offset value and data length (STEP 1106). The requester 22 generates the request message for obtaining the specified partial data and the communicator 23 transmits this to the Web server 4 (STEP 1105).

The analyzer 91 judges whether there are any unselected structural data (STEP 1107) and, when it judegs that unselected structural data exists, returns to STEP 1101 and repeats the aforementioned processing steps.

Referring to this embodiment, although it is structured such that the data format is judged upon determining the structure of the resource with the analyzer 91, it is not limited thereto.

For example, it may also be structured such that the data format is judged upon generating a request message for requesting data transfer with the requester 22.

According to the present embodiment as mentioned above, as the data format is judged and a transfer request is only made only for printable data upon making such transfer request, data unprintable with a printer is not transmitted from the server. It is therefore possible to shorten the time from obtaining the resource until printing the same. Moreover, network resources may be used efficiently.

Further, as a transfer request is made only for data necessary in printing (1 frame worth for example) when the data format is moving picture data, similarly, it is possible to shorten the time from obtaining the resource until printing the same. Network resources may be used efficiently as well.

[Other Embodiments]

Figure 12:
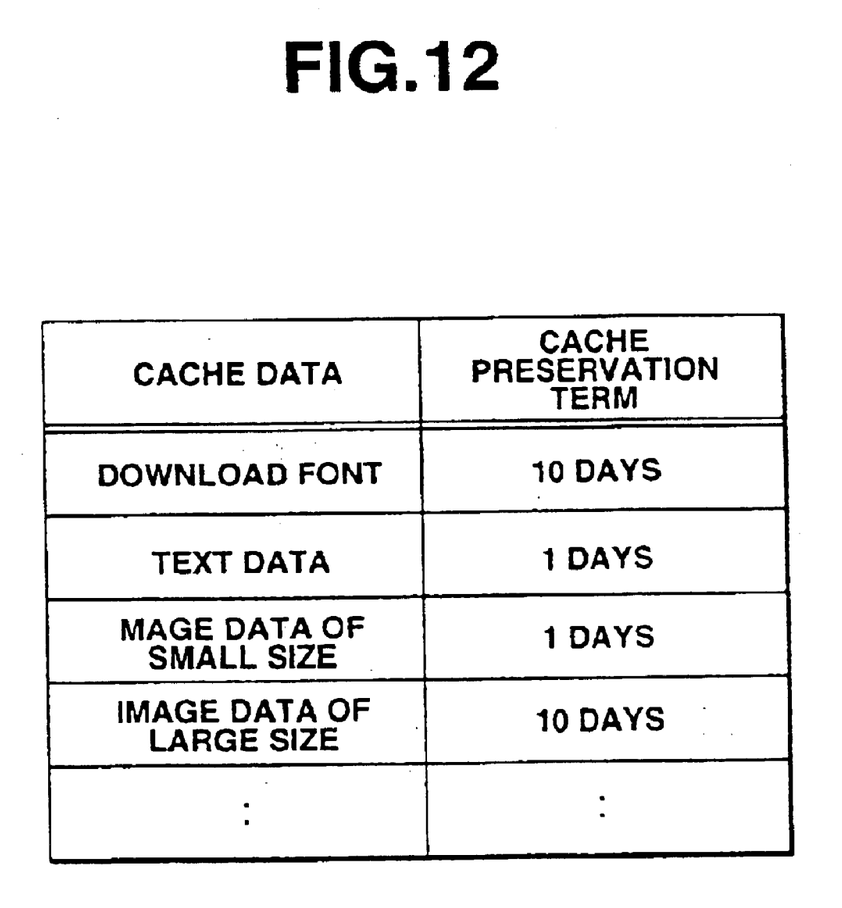
FIG. 12 is a diagram for explaining one example of a cache.

In the cache 25 shown in the aforementioned embodiments, attribute information may be used as the algorithm for removing the cached data. For example, as shown in FIG. 12, a cache preservation term may be provided according to the type of data. In FIG. 12, a longer cache preservation term is set to download data and image data of a large size in comparison to other data. This cache preservation term is set according to the data size or frequency of data use. The cache storage unit 25 removes the data in which the cache preservation term has elapsed according to the removal algorithm, and caches new data.

According to the present embodiment as mentioned above, as data of a large size and frequently used data are cached for a longer period of time, a communication load for obtaining such data will not arise. Therefore, it is possible to shorten the time from obtaining the resource until printing the same, and network resources may be used efficiently.

While each of the aforementioned embodiments is an example for explaining the present invention, it shall be understood that the invention is not limited to such embodiments. The present invention may be employed in various other applications so as long as one does not deviate from the gist of the invention.

The entire disclosure of Japanese Patent Application No. 10-336670 filed on Nov. 27, 1999 including specification, claims, drawings and summary are incorporated herein by reference in its entirety.

I claim:

1. A printer, comprising:

first request means which directly makes a first request for obtaining a resource from a server;

structural means for determining the structure of the resource based on a response directly from said server to said first request;

setting means for setting pages to be printed based on the structure of said determined resource;

second request means which generates a request message for requesting the transmission of partial data of the desired page to be printed after the pages to be printed have been set based on the structure of the resource from a server;

means for generating print data on a second response to said second request; and printing means for printing based on said generated print data;

wherein the first request means, the structural means, the setting means, the second request means, the means for generating print data, and the printing means are located on said printer.

2. The printer according to claim 1, wherein said printer further comprises judgment means for judging the data format of said structural data, and said second request means makes a second request in accordance with the judgment of said judgment means.

3. The printer according to claim 2, wherein said judgment means judges whether the data format of said structural data is printable data, and said second request means makes a second request for obtaining the structural data judged as being printable data by said judgment means.

4. The printer according to claim 2, wherein said judgment means judges whether the data format of said structural data is moving picture data, and said second request means makes a second request for obtaining specified frame data structuring the structural data judged as being moving picture data by said judgment means.

5. The printer according to claim 1, wherein said second request means obtains the structural data with the offset value from the top position of the resource or by designating the data length.

6. The printer according to claim 3, wherein said judgment means judges whether the data format of said structural data is moving picture data, and said second request means makes a second request for obtaining specified frame data structuring the structural data judged as being moving picture data by said judgment means.

7. The printer according to claim 1, wherein said structural means determines the page layout of said resource based on information relating to size of data and information relating to the position of data included in said response directly from said server to said first request, and said setting means sets the pages to be printed in accordance with said determined page layout.

8. A recording medium for recording a program for controlling a printer, said printer having a print engine for printing to a print medium, wherein said program comprises:

first request module which directly makes a first request to a server for obtaining a resource there from;

structural module for determining the structure of data based on a response directly from said server to said first request;

setting module for setting pages to be printed based on the structure of said determined data;

second request module which directly makes a second request for the transmission of partial data of the desired page to be printed after the pages to be printed have been set based on the structure of the resource from a server;

generating module for generating print data based on a second response to said second request; and providing module for providing said generated print data to said print engine;

wherein said program is located on said printer.

9. A printer controlling method comprising the steps of:

directly making a first request for obtaining a resource;

determining the structure of said resource based on a first response to said first request;

directly making a second request for setting pages to be printed based on the structure of said determined resource and directly obtaining the structural data within said set pages to be printed;

wherein the second request step is performed in accordance with the data format of said structural data; and wherein upon judging whether the data format of said structural data is printable, said second request step is performed to the structural data judged as being said printable data;

wherein, upon judging whether the data format of said structural data is moving picture data, and if judged as being said moving picture data, said second request step is performed to a specified frame data within said structural data.

* * * * *